Sept. 18, 1923.  W. O. KING ET AL  1,468,303
MACHINE FOR SPREADING CRUSHED STONE AND OTHER MATERIAL
Original Filed July 6, 1918
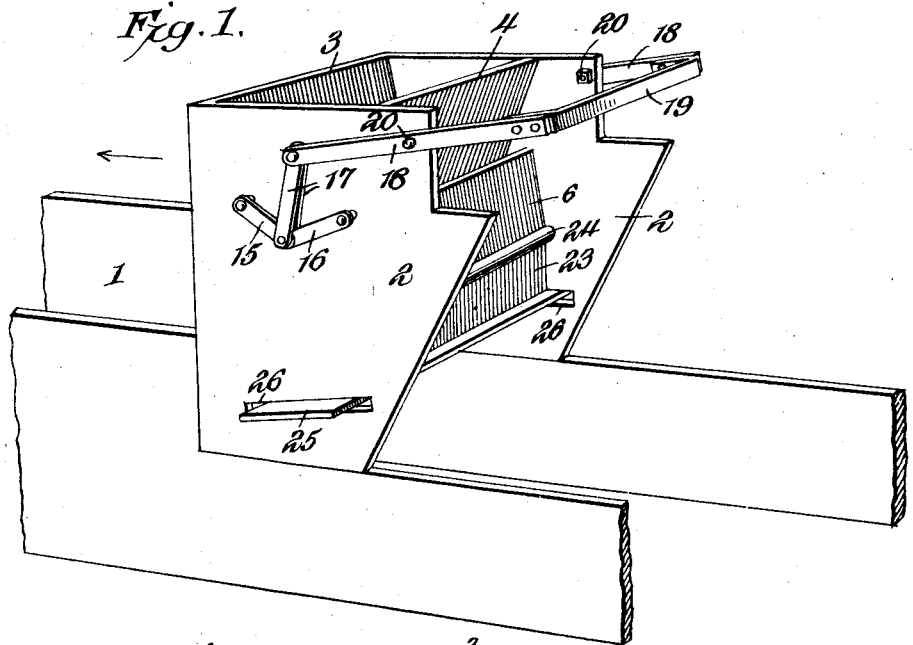
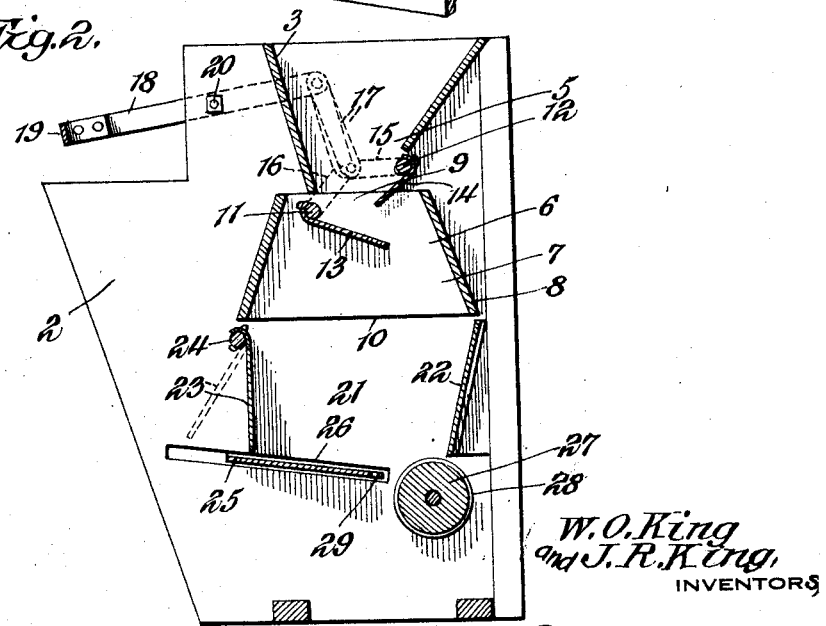
W. O. King
and J. R. King,
INVENTORS Patented Sept. 18, 1923.

1,468,303

UNITED STATES PATENT OFFICE.

WILLIAM O. KING, OF SIDNEY, AND JOSHUA R. KING, OF NEW HAVEN, NEW YORK.

MACHINE FOR SPREADING CRUSHED STONE AND OTHER MATERIAL.

Original application filed July 6, 1918, Serial No. 243,542. Divided and this application filed February 4, 1921. Serial No. 442,426.

*To all whom it may concern:*

Be it known that we, WILLIAM O. KING and JOSHUA R. KING, citizens of the United States, residing, respectively, at Sidney, in the county of Delaware and State of New York, and New Haven, in the county of Oswego and State of New York, have invented a new and useful Machine for Spreading Crushed Stone and Other Material, of which the following is a specification.

This invention has reference to machines for spreading crushed stone and other material, and its object is to provide a machine which will evenly spread crushed stone or the like to form a dressing for roadways upon which latter a layer of tar or oil has been deposited.

In accordance with the invention, there is provided a hopper structure to be mounted upon a vehicle, which latter may be attached to and follow a tank from which tar or oil is deposited upon a roadway, the hopper having associated therewith appropriate mechanism for distributing and controlling the distribution of crushed stone or such top dressing.

This application is a division of another application, Serial No. 243,542, filed by us on July 6th, 1918, for a machine for spreading crushed stone and other material.

The invention will be best understood from a consideration of the following detailed description taken in connection with the accompanying drawing, forming part of this specification, with the understanding, however, that the invention is not confined to any strict conformity with the showing in the drawing, but may be changed and modified so long as such changes and modifications mark no material departure from the salient features of the invention as expressed in the appended claims.

In the drawings:

Fig. 1 is a perspective view of a portion of a vehicle with the invention applied, but omitting certain parts shown in the aforesaid application, but not entering into the present invention.

Fig. 2 is a section in a plane in the direction of the travel of the vehicle, showing certain parts entering into the invention and omitting other parts.

Referring to the drawings, there is shown a portion of a body 1 of a vehicle on which there is erected side upright plates or boards 2, connected by other plates or boards 3, 4 suitably oppositely slanted so as together to constitute a hopper contracting downwardly toward a throat 5, through which crushed stone or other suitable material may gravitate. Below the throat 5, there is an expanded member 6 constituting a chute having side boards or plates 7 and end boards or plates 8, the chute expanding from the upper receiving end 9 to an expanded discharge end 10.

Extending across the space between the upright plates or boards 2 and journaled at the ends therein are two shafts 11 and 12 respectively, the shaft 11 being within the chute 6 beneath the end member or board 3 of the hopper, while the shaft 12 is journaled in the side boards 2 beneath the lower end of the board 4 of the hopper and above the chute 6, whereby the shaft 12 is located at a considerable distance above the level of the shaft 11.

The shaft 11 carries a shutter or valve 13 and the shaft 12 carries another shutter or valve 14 with the free end of the valve 14 overlapping the corresponding end of the valve 13 and located above the latter. Both valves are fixed to the respective shafts 11 and 12 so as to participate in rocking movements of these shafts and these shafts are controlled by links 15 and 16 approaching and connected at their near ends by other links 17 joined to a rock arm 18 controlled by a raising and lowering bar 19 carried by pivot pins or bolts 20 so that an operator may control the valves 13 and 14 simultaneously.

Below the chute 10 is another chute 21 with one solid end 22 while the chute has another side 23 pendantly carried by a rock shaft 24, so that the end 23 may be opened or closed with respect to the chute 21. The bottom of the chute 21 is constituted by a slidable plate 25 mounted in slots 26 through the side plates 22 so that the bottom of the chute 21 may be adjusted. Beneath the end plate 22 of the chute or compartment 21 is a roller 27 for controlling, in conjunction with the slidable plate 25, the discharge opening of the chute or compartment 21.

The plate 25 is movable toward and from the roller 27 and the latter is provided with peripheral grooves 28, while the edge of the plate 25 toward the roller 27 is furnished with teeth 29, whereby material passing between the teeth 29 and the grooves 28, which are coactively related, produces an even distribution and the material is made to pass from the compartment 21 in a widely and evenly distributed stream.

The structure of the spreading machine is described and illustrated in the aforesaid application, which structure includes the showing illustrated in the accompanying drawings and described and hereinafter claimed in this application.

In laying or repairing roads, or for other purposes, the vehicle 1 is supplied with a suitable amount of crushed stone, which may be transferred from the body of the vehicle into the hopper 3, 4, with the valves or shutters 13, 14 raised at their free ends so that the valve 13 underlies and underlaps the valve 14 in a manner to prevent the gravitating of the crushed stone from the overlying hopper. When the structure is in operation, the bar 19 is manipulated in a manner to lower the valves 13 and 14, so that crushed stone in the hopper drops through the throat 5 onto the valve 14, which then stands at a lowering angle with the valve 13 also standing at a lowering angle, but oppositely directed from the valve 14, whereupon crushed stone can only leave the hopper by a tortuous path, but such that the discharge from the hopper is gravitational and requires no agitating devices for discharging the hopper into the chute 6 and from thence into the compartment 21 for ultimate discharge by way of the opening established between the plate or valve 25 and the roller 27.

There is no danger of the material clogging or catching in its progress from the hopper to the distributor formed between the roller 27 and valve or plate 25 and experience has shown that the distribution of the material on the roadway is particularly even.

What is claimed is:—

1. In a machine for spreading crushed stone or other material, a receptacle for the material, and means for controlling the discharge of material from the receptacle, comprising two opposed rockable superposed imperforate valves or shutters with the under valve wider than and underlapping the upper valve, means for simultaneously moving the valves to close and open the discharge end of the receptacle whereby the lower valve will direct the flow of material from the receptacle with the upper valve directing the flow of material onto the lower valve.

2. In a machine for spreading material, a receiving hopper with a discharge throat provided with two oppositely rockable superposed imperforate valves or shutters at different altitudes, the higher valve being narrower than the lower valve and underlapped by said lower valve, means for simultaneously moving the valves to close and open the discharge end of the hopper whereby the higher valve directs material onto the lower valve and the lower valve discharges the material to one side of the upright center line of the hopper.

3. In a machine for spreading material, a receiving hopper, two opposed, oppositely rockable superposed imperforate valves or shutters at the discharge end of the hopper with the lower valve wider than and underlapping the upper valve, rock shafts at different altitudes and carrying the respective vales, said rock shafts being located at respectively opposite sides of the hopper, and link and lever connections for simultaneously moving the valves to close and open the discharge end of the hopper.

4. In a machine for spreading material, a receiving hopper for the material, two opposed, rockable superposed imperforate valves at the discharge end or throat of the hopper, with one valve located at the throat of the hopper to one side thereof and directed toward the other side of the throat of the hopper, and another valve at a lower level and located under the first valve and also directed oppositely to the first valve to receive material therefrom and direct it oppositely to the first valve, separate rock shafts on which the valves are mounted, links connecting the rock shafts, a rock arm controlled by a raising and lowering bar, and other links connecting the first-mentioned links to the rock arm.

In testimony that we claim the foregoing as our own, we have hereto affixed our signatures.

WILLIAM O. KING.
JOSHUA R. KING.